(12) United States Patent
Gulati et al.

(10) Patent No.: US 10,129,035 B2
(45) Date of Patent: Nov. 13, 2018

(54) DEVICE BIRTH CERTIFICATE

(71) Applicant: Data I/O Corporation, Redmond, WA (US)

(72) Inventors: Rajeev Gulati, Sammamish, WA (US); Anthony Ambrose, Kirkland, WA (US)

(73) Assignee: Data I/O Corporation, Redmond, WA (US)

( * ) Notice: Subject to any disclaimer, the term of this patent is extended or adjusted under 35 U.S.C. 154(b) by 0 days.

(21) Appl. No.: 15/201,368

(22) Filed: Jul. 1, 2016

(65) Prior Publication Data
US 2017/0048070 A1 Feb. 16, 2017

Related U.S. Application Data

(60) Provisional application No. 62/203,362, filed on Aug. 10, 2015.

(51) Int. Cl.
*H04L 9/32* (2006.01)
*H04L 9/08* (2006.01)

(52) U.S. Cl.
CPC .......... *H04L 9/3268* (2013.01); *H04L 9/0861* (2013.01)

(58) Field of Classification Search
CPC ............................. H04L 9/3268; H04L 9/0861
See application file for complete search history.

(56) References Cited

U.S. PATENT DOCUMENTS

| | | | |
|---|---|---|---|
| 7,376,837 B1 | 5/2008 | Medvinsky | |
| 7,984,511 B2 * | 7/2011 | Kocher | G11B 20/00086 726/27 |
| 7,987,510 B2 * | 7/2011 | Kocher | G11B 20/00086 726/27 |
| 8,736,299 B1 * | 5/2014 | Pedersen | H03K 19/17768 326/38 |
| 9,571,484 B2 * | 2/2017 | Doyle | H04L 9/3268 |
| 9,602,292 B2 * | 3/2017 | Ramatchandirane | H04L 9/3268 |
| 9,672,385 B2 * | 6/2017 | Newell | G06F 21/76 |
| 9,767,321 B1 * | 9/2017 | Pedersen | G06F 21/76 |
| 2003/0095665 A1 | 5/2003 | Wheeler et al. | |
| 2004/0054907 A1 | 3/2004 | Chateau et al. | |
| 2005/0144437 A1 * | 6/2005 | Ransom | G06F 1/28 713/151 |
| 2008/0101604 A1 * | 5/2008 | Kocher | G11B 20/00086 380/210 |
| 2008/0133938 A1 * | 6/2008 | Kocher | G11B 20/00086 713/193 |
| 2008/0270805 A1 * | 10/2008 | Kean | G06F 17/5054 713/189 |

(Continued)

OTHER PUBLICATIONS

World Intellectual Property Organization, Application No. PCT/US16/46229, International Search Report dated Nov. 2, 2016.

(Continued)

*Primary Examiner* — Saleh Najjar
*Assistant Examiner* — Louis C Teng
(74) *Attorney, Agent, or Firm* — Wong & Rees LLP

(57) ABSTRACT

A device identification is generated for a programmable device. A security key is generated to protect a content of the programmable device. A device birth certificate is generated with the device identification and the security key. The programmable device is programmed with the device birth certificate at time of manufacture of the programmable device.

20 Claims, 11 Drawing Sheets

(56) References Cited

U.S. PATENT DOCUMENTS

| | | | |
|---|---|---|---|
| 2009/0083372 A1* | 3/2009 | Teppler | H04L 9/3226 709/203 |
| 2009/0327634 A1 | 12/2009 | Bovee | |
| 2010/0037293 A1* | 2/2010 | StJohns | H04L 9/3263 726/2 |
| 2010/0293273 A1* | 11/2010 | Basarrate | H04L 63/1458 709/224 |
| 2011/0029783 A1* | 2/2011 | Thorsen | G06F 21/73 713/189 |
| 2012/0036364 A1* | 2/2012 | Yoneda | H04L 9/30 713/175 |
| 2013/0129087 A1 | 5/2013 | Qi et al. | |
| 2015/0100793 A1* | 4/2015 | Newell | G06F 21/76 713/189 |
| 2015/0242615 A1* | 8/2015 | Newell | G06F 21/44 726/30 |
| 2015/0242620 A1* | 8/2015 | Newell | G06F 21/44 726/30 |
| 2015/0281220 A1* | 10/2015 | Doyle | H04L 9/3268 713/156 |
| 2016/0294829 A1* | 10/2016 | Angus | H04L 63/0876 |
| 2017/0026187 A1* | 1/2017 | Ramatchandirane | H04L 9/3268 |
| 2017/0308721 A1* | 10/2017 | Pedersen | G06F 21/76 |

OTHER PUBLICATIONS

World Intellectual Property Organization, Application No. PCT/US16/46229, Pending Claims as of Nov. 2, 2016.

* cited by examiner

DEVICE BIRTH CERTIFICATE

PRIORITY CLAIM

This application claims benefit of Provisional Application No. 62/203,362, filed Aug. 10, 2015, the entire contents of which is hereby incorporated by reference as if fully set forth herein, under 35 U.S.C. § 119(e).

TECHNICAL FIELD

Embodiments relate generally to secure programming systems, and, more specifically, to techniques for security.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Certain operations of electronic circuit board assembly are performed away from the main production assembly lines. While various feeder machines and robotic handling systems populate electronic circuit boards with integrated circuits, the operations related to processing integrated circuits, such as programming, testing, calibration, and measurement are generally performed in separate areas on separate equipment rather than being integrated into the main production assembly lines.

Customizable integrated circuits or devices, such as Flash memories (Flash), electrically erasable programmable read only memories (EEPROM), programmable logic devices (PLDs), field programmable gate arrays (FPGAs), and microcontrollers incorporating non-volatile memory elements, can be configured with separate programming equipment. Programming equipment is often located in a separate area from the circuit board assembly lines.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
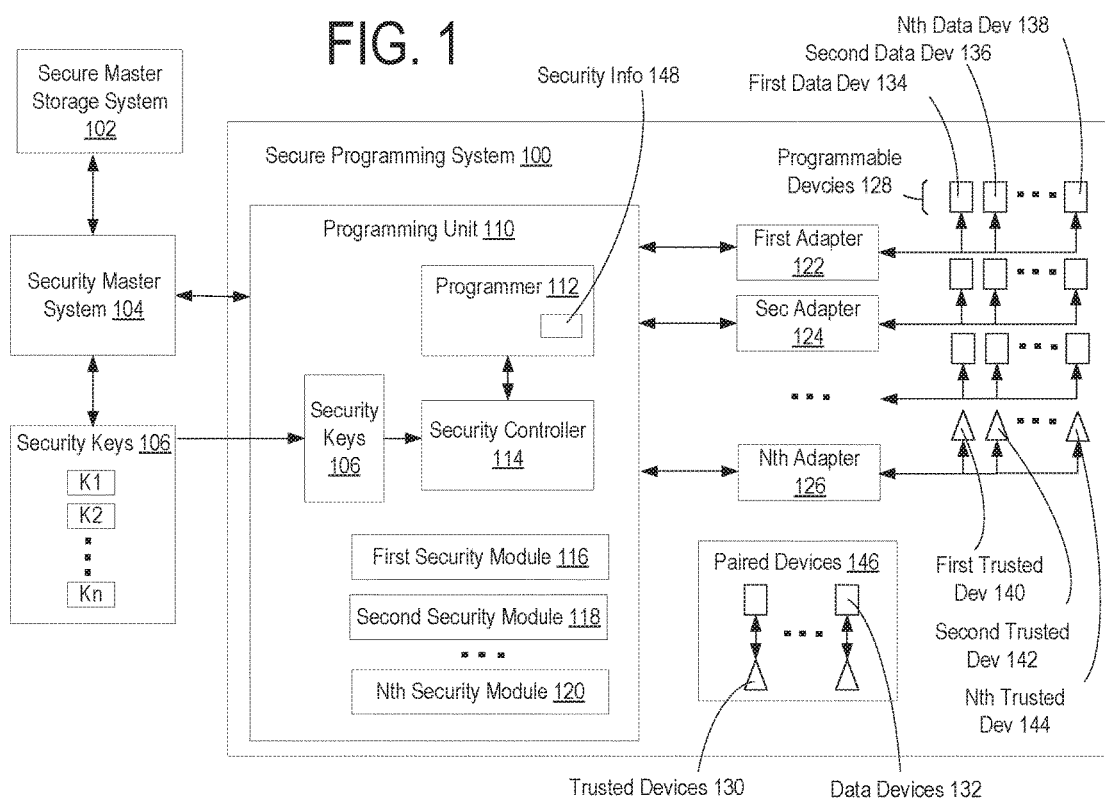
FIG. 1 is an illustrative view of a secure programming system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
    2.0. Structural Overview
    3.0. Functional Overview
    4.0. Example Embodiments
    5.0. Implementation Mechanism—Hardware Overview
    6.0. Extensions and Alternatives

1.0. GENERAL OVERVIEW

Approaches, techniques, and mechanisms are disclosed for provisioning programmable devices in a secure manner. A secure programming system may individually encrypt a target payload of data and code and then program information into each individual programmable device. The secure programming system may create a customized payload package that can only be decrypted by a system or a device having correct security keys. Such customization may be needed to meet the demands set by the trends of microcontrollers with the addition of security features.

There has been demand for global manufacturing and programming for devices of increasing densities and speeds. Programming data may be often created on one continent and programmed in another. Original equipment manufacturers (OEMs) may frequently create programming images, but multiple contract manufacturers (CMs) or programming centers may program data into parts or devices using the images. As such, security and traceability of the programming data are very important to OEMs and CMs.

Configurations of the security keys can control the operations of the programmable devices. The security keys can allow the programmable devices to be programmed or accessed only when the programmable devices are identified as valid. Programmable devices may include memory chips, printed circuit boards (PCBs), electronic devices (e.g., smart phones, media players, etc.), microcontrollers, microprocessors, application processors, programmable logic devices, field programmable gate arrays, other consumer and industrial electronic devices, etc.

To enhance the security and traceability of a programmable device, a digital "birth" certificate may be injected into a programmable device during manufacture of the programmable device. The birth certificate can allow the device to have a unique identity so that it may be authorized to be programmed at a CM or OEM facility to have specific computing functionalities. The birth certificate can also allow the device to be eventually used by an authorized user.

The identity that was programmed into the birth certificate during manufacture of the device allows access to or operations of only valid or authorized devices. Without such identity, other approaches are vulnerable to having unauthorized, fake, or clone devices used in a system. The identity may be recognized using a unique identifier that is used to validate whether the device is genuine or not. An example of the unique identifier may be a serial number of the device, a location where the device is manufactured or programmed, a name of a manufacturer who makes the device, a time when the device is manufactured or programmed, etc.

Another example of the unique identifier may be a version of a firmware to be programmed into the device, a type of security key(s) that may be used with cryptography to protect the birth certificate or other information in the device, etc. To make the device even more secure, any combination of the examples given above may be used to make it harder for any illegal attempts to make, use, copy, etc., the device or its contents.

Having the birth certificate embedded in the device at the time the device is manufactured eliminates fake devices. The birth certificate may be securely stored in an area of the device that cannot be tampered with or illegally accessed by unauthorized users. This defeats the cloning or duplication of the device.

In other aspects, the invention encompasses computer apparatuses and computer-readable media configured to carry out the foregoing techniques.

2.0. STRUCTURAL OVERVIEW

Referring now to FIG. 1, therein is shown an illustrative view of various aspects of a secure programming system 100 in which the techniques described herein may be practiced, according to an embodiment. The secure programming system 100 can individually configure data devices and active, trusted devices with cryptographic information to provide a secure programming and operation environment.

The secure programming system 100 comprises at least a programming unit 110 having a programmer 112, a security controller 114, security keys 106, adapters for coupling to programmable devices, a first security module 116, a second security module 118, and an nth security module 120. The secure programming system 100 can be coupled to a security master system 104 having a secure master storage system 102.

The security master system 104 and the secure master storage system 102 can generate and securely store the security keys 106. For example, the security keys 106 can be used for cryptography algorithms, device authentication, code signing, data encryption, data decryption, etc.

For example, the security keys 106 used for cryptography algorithms can include a single symmetric key, an asymmetric key pair, etc. Also, for example, the security keys 106 used for device authentication or code signing can include an asymmetric public-private key pair, etc. Further, for example, the security keys 106 used for data encryption or decryption can include a single symmetric key for symmetric encryption/decryption, an asymmetric key pair with a public key and a private key for asymmetric encryption/decryption, etc.

As an example, single symmetric keys may be used by algorithms for cryptography that use the same cryptographic keys for both encryption of plaintext and decryption of ciphertext. The keys may be identical or there may be a simple transformation to go between the two keys. The keys may represent a shared secret between two or more devices that can be used to maintain a private information link.

As another example, asymmetric key pairs may be used by algorithms for public-key cryptography or asymmetric cryptography. The asymmetric key pairs may be used by any cryptographic system that uses pairs of keys: public keys that may be disseminated widely paired with private keys, which may be known only to the owners of the private keys. For example, the asymmetric key pairs may have at least two functions: using a public key to authenticate that information originated with a holder of the paired private key, or encrypting information with a public key to ensure that only the holder of the paired private key can decrypt it.

For example, in a public-key encryption system, any transmitting device can encrypt information using the public key of the receiving device, but such information can be decrypted only with the receiving device's private key. For this to work, a user may be able to computationally generate a public and private key pair to be used for encryption and decryption. The strength of a public-key cryptography system may rely on the degree of difficulty (e.g., computational impracticality) for a properly generated private key to be determined from its corresponding public key. Security then may depend only on keeping the private key private, and the public key may be published without compromising security.

System 100 comprises one or more computing devices. These one or more computing devices comprise any combination of hardware and software configured to implement the various logical components described herein, including components of the programming unit 110 having the programmer 112, the security controller 114, the adapters, the first security module 116, the second security module 118, and the nth security module 120. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

The programming unit 110 can be a secure system for programming data, metadata, and code onto the programmable devices 128. The programming unit 110 can receive security information from the security master system 104, process the information, and transfer an individually configured version of the security information to the programmable devices 128.

The programming unit 110 can include the programmer 112. The programmer 112 can be an electromechanical system for physically programming the programmable devices 128. For example, the programmer 112 can receive a tray containing the programmable devices 128, electrically couple the programmable devices 128 to an adapter unit, and transfer security information into the programmable devices 128. The programming unit 110 can receive individualized status information from each of the programmable devices 128 and customize the security information transferred to each of the programmable devices 128 on an individual device basis. For example, each of the programmable devices 128 can receive an individual block of information that is different from the information transferred to others of the programmable devices.

The programmer 112 can be coupled to one or more of the adapters that can be used to access the programmable devices 128. The adapters can include a first adapter 122, a second adapter 124, and a nth adapter 126.

In an illustrative example, the first adapter 122 can be a hardware device that can be used to electrically connect one or more of the programmable devices to the programmer 112. The programmer 112 can then transfer a version of the security information to one of the programmable devices 128. The first adapter 122 can include one or more sockets for mounting the programmable devices 128. The first adapter 122 can include a socket, a connector, a zero-insertion-force (ZIF) socket, or a similar device to mounting integrated circuits.

Although the adapters are described as electromechanical units for mounting the programmable devices 128, it is understood that the adapters can have other implementations as well. For example, if the programmable devices 128 are independent electronic devices, such as a cell phone, a consumer electronic device, a circuit board, or a similar device with active components, then the adapters can include mechanisms to communicate with the programmable devices 128. The adapters can include a cable link, a wireless communication link, an electronic data bus interface, an optical interface, bed-of-nails contacts or fixtures for In-System Programming (ISP), or any other communication mechanism.

ISP, also called In-Circuit Serial Programming (ICSP), may refer to the ability of a chip, such as a programmable logic device, a microcontroller, other embedded devices, etc., to be programmed while installed in a system, rather than having the chip be programmed prior to installing it into the system. ISP may use programming protocols for programming a device, such as Peripheral Interface Controller (PIC) microcontrollers, the Parallax Propeller, etc.

The programmable devices 128 are devices that can be provisioned with secure information by the programming unit 110. For example, the programmable devices 128 can include data devices such as flash memory units, programmable read only memories, secure data storage devices, or other data storage devices.

Provisioning may include transferring data and/or code information to a device. For example, a flash memory unit can be provisioned by programming it with data.

The programmable devices 128 can also include trusted devices 130 that include security data and security programming information. For example, the programmable devices 128 can include trusted devices 130 such as cell phones, hardware security modules, trusted programming modules, circuit board, or similar devices.

The data devices 132 can include any number of devices, e.g., a first data device 134, a second data device 136, and a nth data device 138. The trusted devices 130 can include any number of trusted devices, e.g., a first trusted device 140, a second trusted device 142, and up to a nth trusted device 144.

The programmable devices 128 can each be provisioned with individually customized security information. Thus, each of the programmable devices 128 can include a separate set of the security keys 106 that can be used to individually encrypt the data stored in programmable devices 128. This provides the ability to encrypt security information 148 differently on each of the programmable devices 128 to maximize security.

The programmable devices 128 can be configured to include paired devices 146. The paired devices 146 are two or more of the programmable devices 128 that can share one or more of the security keys 106. This can allow each of the paired devices 146 to detect and authenticate another of the paired devices 146 in the same group. Thus data from one of the paired devices 146 can be shared with another one of the paired devices 146. This can allow functionality such as sharing information, authenticating a bi-directional secure communication channel between two or more of the paired devices 146, identifying other related devices, or a combination thereof.

In an illustrative example, the secure programming system 100 can be used to establish one of the paired devices 146 having the first data device 134, such as a system information module (SIM) chip, paired with the first trusted device 140, such as a smart phone. In this configuration, the first data device 134 and the first trusted device 140 can both be programmed with the security keys 106 for the paired devices 146. Thus the first trusted device 140 can validate the security information 148, such as a serial number, of the first data device 134 to authenticate that the first trusted device 140 is allowed to use the other information on the first data device 134.

The programming unit 110 can include a security controller 114 coupled to the programmer 112. The security controller 114 are computing devices for processing security information. The security controller 114 can include specific cryptographic and computational hardware to facility the processing of the cryptographic information. For example, the security controller 114 can include a quantum computer, parallel computing circuitry, field programmable gate arrays configured to process security information, a co-processor, an array logic unit, a microprocessor, or a combination thereof.

For illustrative purposes, the security controller 114 is shown as a separate unit from the programmer 112, although it is understood that the security controller 114 may be implemented in a different manner. For example, the security controller 114 and the programmer 112 may be implemented in the same physical hardware unit, device, system, etc.

The security controller 114 can be a secure device specially configured to prevent unauthorized access to security information at the input, intermediate, or final stages of processing the security information. The security controller 114 can provide a secure execution environment for secure code elements to execute in. For example, the security controller 114 can be a hardware security module (HSM), a microprocessor, a trusted security module (TPM), a dedicated security unit, or a combination thereof.

The security controller 114 can be coupled to security modules to provide specific security functionality. The security modules can include a first security module 116, a second security module 118, and a nth security module 120. Each of the security modules can provide a specific security functionality such as identification, authentication, encryption, decryption, validation, code signing, data extraction, or a combination thereof.

For example, the first security module 116 can be configured to provide an application programming interface (API) to a standardized set of commonly used security functions. In another example, the second security module 118 can be a combination of dedicated hardware and software to provide faster encryption and decryption of data.

The programming unit 110 can include the secure storage of one or more of the security keys 106. The security keys 106 can be calculated internal to the secure programming system 100, can be calculated externally and received by the secure programming system 100, or a combination thereof.

The security keys 106 can be used to encrypt and decrypt the security information. The security keys 106 can be used to implement different security methodologies and protocols. For example, the security keys 106 implement a public key encryption system. In another example, the security keys 106 can be used to implement a different security protocol or methodology. Although the security keys 106 can be described as a public key encryption system, it is understood that the security keys 106 can be used to implement different security paradigms.

One of the advantages of the secure programming system 100 includes the ability to provision each of the programmable devices 128 with a different set of the security keys 106 and a different version of the security information 148 encrypted by the individual security keys 106. This can ensure that the security keys 106 used to decrypt the security information 148 on one of the programmable devices 128 cannot be used to decrypt the security information on another one of the programmable devices 128. Each of the programmable devices 128 can have a separate one of the security keys 106 to provide maximum protection.

Figure 2:
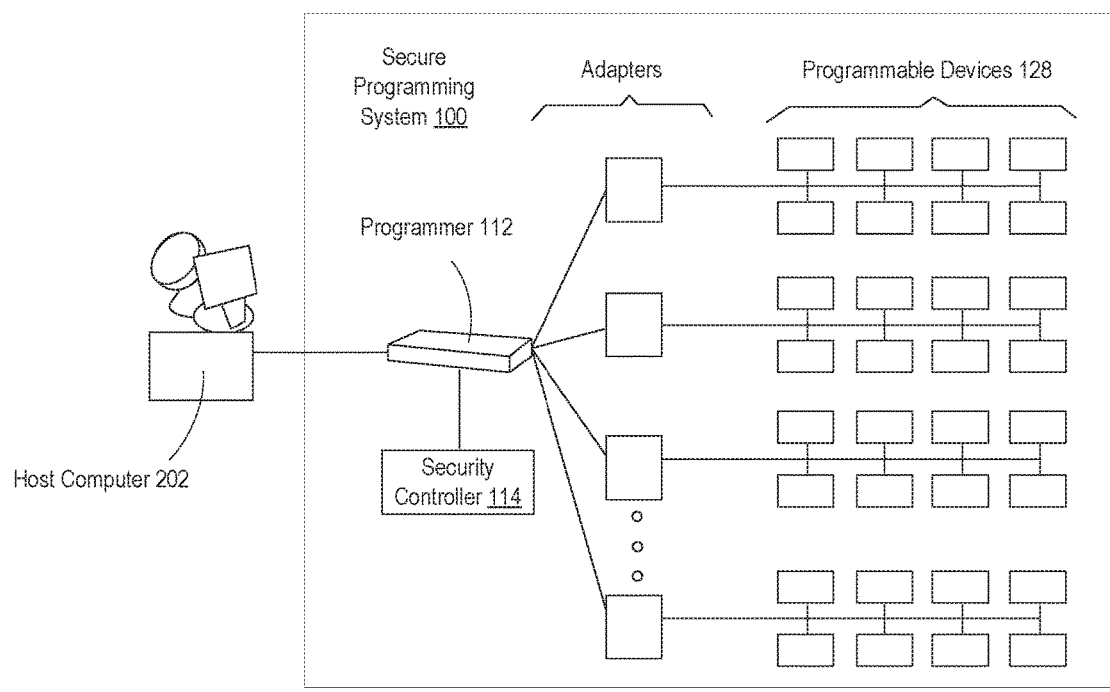
FIG. 2 is an example block diagram of the secure programming system.

Referring now to FIG. 2, therein is shown an example block diagram of the secure programming system 100. The secure programming system 100 may include a system topology that includes the security controller 114 connected to the programmer 112 that interfaces with a host computer 202 and a number of adapters (e.g., 122, 124, 126, etc.). Each of the adapters may interface with a number of the programmable devices 128.

The host computer 202 may include a system that interfaces with the programmer 112 to exchange commands and data to securely configure, program, verify, analyze, etc., the programmable devices 128. For example, the host computer 202 may be the security master system 104, the secure master storage system 102, a server, a workstation, etc.

For illustrative purposes, each adapter shown is connected to eight programmable devices 128, although it is understood that each adapter may be connected to any number of programmable devices 128. For example, the programmable devices 128 may represent, but are not limited to, any of: devices under test (DUT), integrated circuits, media, etc.

Also, for example, each adapter may be connected to any types or any combination of programmable devices 128, including, but not limited to, any of: integrated circuits, media, electronics devices, microcontrollers, microprocessors, application processors, programmable logic devices, FPGAs, smartphones, tablets, laptops, computers, set top boxes, mobile devices, game consoles, display devices, PCBs, media players, mobile phones, smartphones, Internet of Things (IoT) devices, consumer or industrial electronic devices, any other electronic devices, etc. Further, for example, media may include, but are not limited to, any of: volatile memories, non-volatile memories, hard drives, solid state drives (SSDs) removable drives, Compact Disc Read-Only Memory (CD-ROM) or CD-R discs, digital versatile discs (DVD), flash memories, Universal Serial Bus (USB) drives, etc.

The secure programming system 100 may be used by, for example, flash vendors, electronic device manufacturers, programming centers, contract manufacturers (CM), etc., to program the programmable devices 128. The secure programming system 100 may be used to program the programmable devices 128 for on-line or off-line programming.

For example, an on-line programming of the programmable devices 128 by the programmer 112 may be controlled by or connected to any combination of the host computer 202, the security controller 114, a network, etc. Also, for example, an off-line programming of the programmable devices 128 may include a process of setting up the programmer 112 by any combination of the host computer 202, the security controller 114, a network, etc., and the programmer 112 may subsequently program the programmable devices 128 without further intervention by the host computer 202, the security controller 114, the network, etc.

The programmable devices 128 may include, but are not limited to, any of: memory chips, circuit boards, electronic devices (e.g., smart phones, media players, other consumer and industrial electronic devices, etc.), etc. For example, the programmable devices 128 may be programmed by the programmer 112, which may be optimized or configured for programming high-density eMMC devices with memory densities of at least 16 GB.

Figure 3:
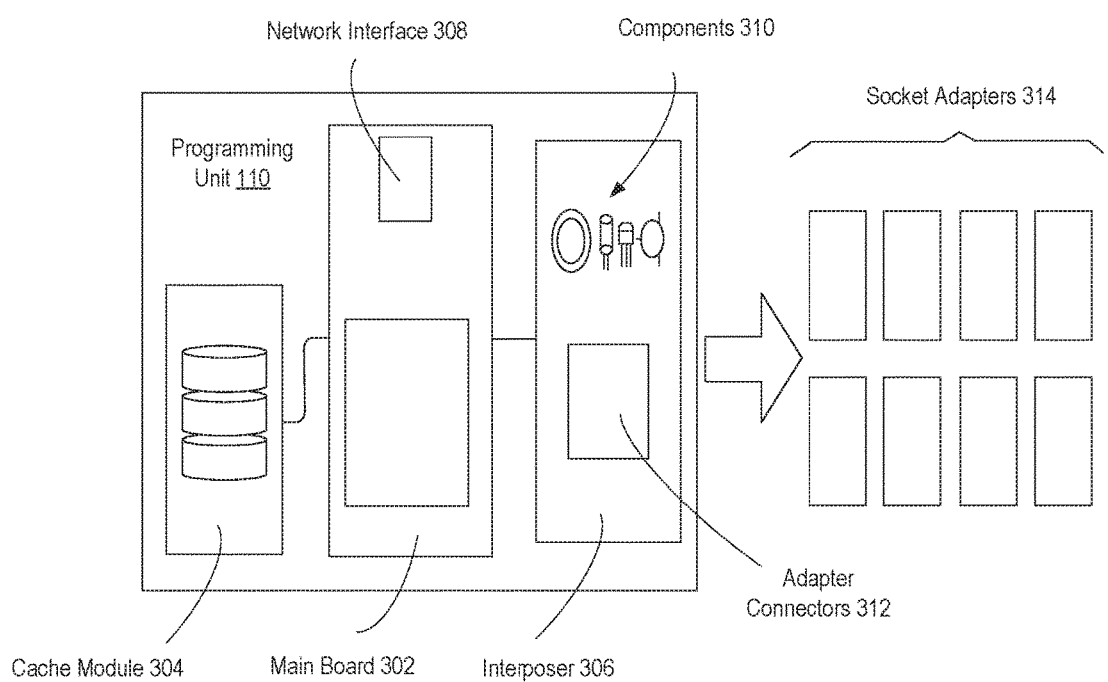
FIG. 3 is a second example block diagram of the secure programming system.

Referring now to FIG. 3, therein is shown a second example block diagram of the secure programming system 100. The secure programming system 100 may include a number of programming units 110. Each programming unit 110 may include a main board 302 that interfaces with a cache module 304 and an interposer 306.

The main board 302 may include a number of printed circuit boards that manage programming operations of a programming unit 110. The main board 302 may exchange control information or payload information with the host computer 202 or the programmable devices 128. The main board 302 may include a network interface 308 for the main board 302 to communicate with the security controller 114, the host computer 202, etc.

The network interface 308 may include wireless networks or wire networks. For example, wireless networks may include, but are not limited to, any of: 802.11, Bluetooth, other types of wireless interfaces, etc. Also for example, wire networks may include, but are not limited to, any of: Gigabit Ethernet (GigE), other networking technologies used in local area networks (LANs) or metropolitan area networks (MANs), etc. The main board 302 may operate using an operating system (OS) including, but is not limited to, any of: Linux, Windows, Macintosh, Android, etc.

The cache module 304 may include storage capacity for storing or retrieving secure information or information that may be used to program the programmable devices 128. The cache module 304 may include any storage capacity for storing program image information. For example, the cache module 304 may include at least 64 GB of storage capacity for storing program image.

The interposer 306 (e.g., a PCB, a substrate, etc.) may include a number of passive or active components 310. The interposer 306 may include a number of adapter connectors 312 assembled on the interposer 306 to provide an interface for the main board 302 to send programming information to the programmable devices 128 or receive programming status or statistics from the programmable devices 128.

The adapter connectors 312 may be physically connected to socket adapters 314, in which the programmable devices 128 may be mounted before the programmable devices 128 are configured, identified, authenticated, or programmed by the security controller 114, the programming units 110, etc. The socket adapters 314 may include individually replaceable sockets. The socket adapters 314 may represent the adapters (e.g., 122, 124, 126, etc.) shown in FIG. 1.

In one or more embodiments, the secure programming system 100 may include any number of functionalities and performance metrics. For example, the programming units 110 may have a data download performance of, but is not limited to, 25 megabytes per second (MB/s) using GigE data download from the host computer 202 to the programmer 112, which may be at least 4 times of a download speed of the current technology. Also, for example, for data programming performance, the programming units 110 may have a speed of, but is not limited to, a 52-MHz double-data-rate (DDR) interface, which is at least 4× a speed of the current technology.

In one or more embodiments, the secure programming system 100 may include any programmer capacities and scalability. For example, the programming units 110 may have a capacity of, but is not limited to, at least 64 GB of local cache in the cache module 304, which may be field upgradeable to, but is not limited to, 128 GB.

In one or more embodiments, the secure programming system 100 may include any number of programming sites, such as the socket adapters 314, per programming unit 110 with one socket per adapter. For example, the secure programming system 100 may be provisioned to support, but is not limited to, eight programming sites per programming unit 110, which is at least two times of a number of programming sites per programmer of the current technology.

In one or more embodiments, the secure programming system 100 may include any number of the programming units 110. For example, the secure programming system 100 may include, but is not limited to, 14 programming units 110.

In one or more embodiments, increased download speeds are greatly simplified using the secure programming system 100. For example, the programming units 110 may increase download speeds by minimizing setup times for large files (e.g., including, but are not limited to, at least 10 GB, etc.) for improved productivity. For large file downloads, the programming units 110 may provide a reduced setup time for configuring the programmable devices 128, transferring and storing programming images, etc., to optimize a machine utilization and a data input/output (I/O) total cost of programming (TCOP).

In one or more embodiments, improved programming or verification speeds may greatly be simplified using the secure programming system 100. The programming units 110 may deliver data to the programmable devices 128 at a speed of, but is not limited to, an interface between the programming units 110 and the programmable devices 128. It is understood that the programming or verification speed of the current technology has not been able to keep up with the speed of the interface between the programmer and the devices.

A maximum program/verify speed of a programming unit 110 may be gated or dependent on sequential read/write speeds of the programmable devices 128. As device speeds increase, the programming unit 110 may program or verify the programmable devices 128 at the device speeds, while speeds of other programmers using the current technology are limited and thus cannot keep up with the device speeds.

For example, the programming units 110 may program or verify the programmable devices 128 at speeds of, but are not limited to, any of: fastest eMMC devices, secure devices (SD), etc., that are available at the time of programming of the devices. Also, for example, for the fastest eMMC devices that are currently available, the programming units 110 may program or verify the programmable devices 128 at a speed of, but is not limited to, 100 MB/s.

For example, the programming units 110 may be operated at a clock speed of, but is not limited to, 50 MHz using double data rate (DDR) clocks. Also, for example, for a 32-GB image, the programming units 110 may program 8 programmable devices 128 in at most 19 minutes, whereas other programmers using the current technology may program only 4 programmable devices 128 in at least 26-42 minutes or 8 programmable devices 128 in at least 33-49 minutes.

The secure programming system 100 may include an increased socket capacity. For example, the programming units 110 in the secure programming system 100 may altogether support, but are not limited to, 112 socket adapters 314 in the secure programming system 100. Also, for example, the secure programming system 100 may have at least 3 times of a socket capacity of the current technology. Further, for example, the secure programming system 100 may have a total cost advantage of 1 programming handler instead of 3 programming handlers of the current technology. A programming handler is a unit that is predefined or pre-configured for the programming units 110 to interface with specific types of the programmable devices 128.

Figure 4:
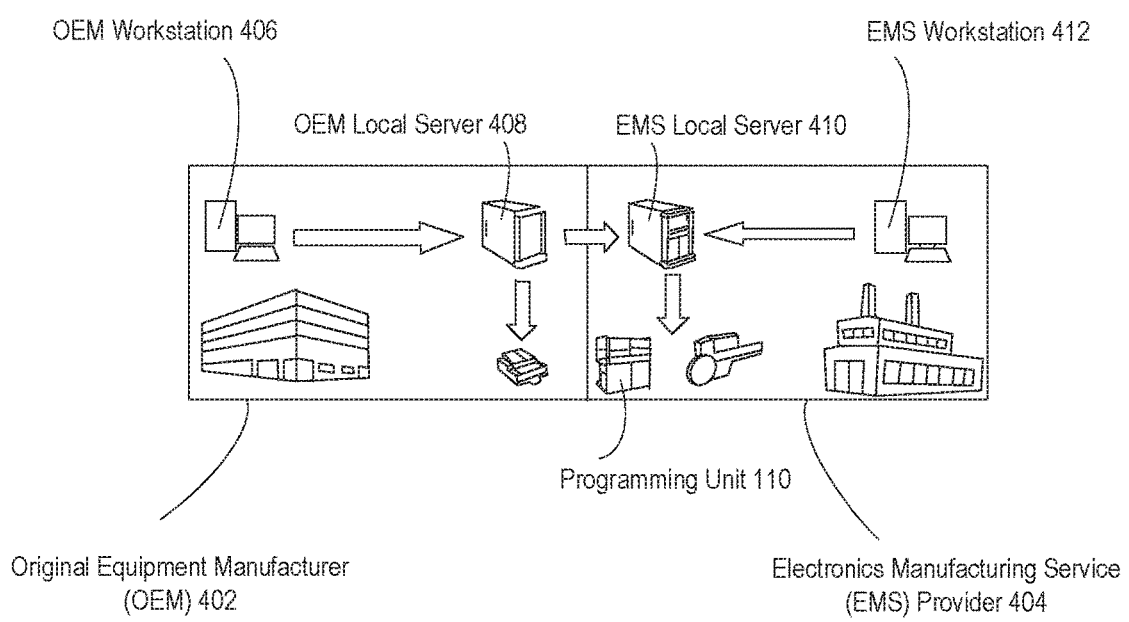
FIG. 4 is an example application of the secure programming system.

Referring now to FIG. 4, therein is shown an example application of the secure programming system 100. The example application may be utilized by an original equipment manufacturer (OEM) 402 to use a secure data management (SDM) architecture of the secure programming system 100 to communicate with an electronics manufacturing service (EMS) provider 404 to program the programmable devices 128.

For illustrative purposes, although the EMS provider 404 is shown as an example of a facility that can program the programmable devices 128, it is understood that any facility may program the programmable devices 128. For example, a programming center or any other facilities may program the programmable devices 128.

In one or more embodiments, the SDM architecture may include processes for a job creation, a job execution, a device identification, a device authentication, a device cryptography, etc., to securely and reliably program the programmable devices 128. The SDM architecture may include processes of programming unique secure information into the programmable devices 128 during manufacture of the programmable devices 128 for traceability and data breach prevention. For example, the programmable devices 128 may include, but are not limited to, any of: Internet of Things (IoT) devices, any other electronics devices, etc.

The SDM architecture may include a connected programming strategy, for multinational corporations (MNC) that have a global network of a variety of interconnected devices including, but are not limited to, any of: mobile phones, automotive electronics, computers, etc. The SDM architecture may enable an offshore manufacturing strategy and a just-in-time (JIT) programming method that eliminates inventory security risks.

The secure programming system 100 may support global manufacturing. The secure programming system 100 may provide a SDM environment with a fully connected infrastructure from headquarters to manufacturing sites.

The secure programming system 100 may secure programming job files from creation in engineering departments to factory floors, whether in-house at an OEM facility or remotely at an electronic manufacturing supplier (EMS) site. For example, an EMS may represent a contract manufacturer (CM), etc. The secure programming system 100 may restrict access to the programming job files to only the programmer 112 with an option for JIT or offline automated programming.

For example, the programming job files may be created by the OEM workstation 406. The job files may then be sent to the OEM local server 408 to schedule jobs to be tested at the OEM 402. The job files may be pushed or sent to the EMS local server 410. The EMS workstation 412 may select which jobs to download and run on the programming unit 110 at the EMS site.

The secure programming system 100 may provide serialization of each programmable device 128 with a unique identification (ID). The unique identification may be generated using serialization, which may include a process of sequentially generate serial numbers and assigning the serial numbers to devices as the devices are programmed. A serial number may uniquely identify each device. For example, the serialization may be applied to or used by any of: integrated circuits, media, electronics devices, microcontrollers, microprocessors, application processors, programmable logic devices, FPGAs, smartphones, tablets, laptops, computers, set top boxes, mobile devices, game consoles, display devices, PCBs, media players, mobile phones, smartphones, IoT devices, consumer or industrial electronic devices, any other electronic devices, etc.

The secure programming system 100 may link job files to a programming algorithm. The secure programming system 100 may provide programming statistics that serve as unique IDs. The secure programming system 100 may combine job files, serial numbers, security keys, programming data statistics, etc., for the programmer 112 to create a device birth certificate 504. As such, the device birth certificate 504 may establish a Root of Trust (RoT), which may be combined with other security features (e.g., identification, authentication, cryptography, etc.) to provide additional levels of security.

Figure 5:
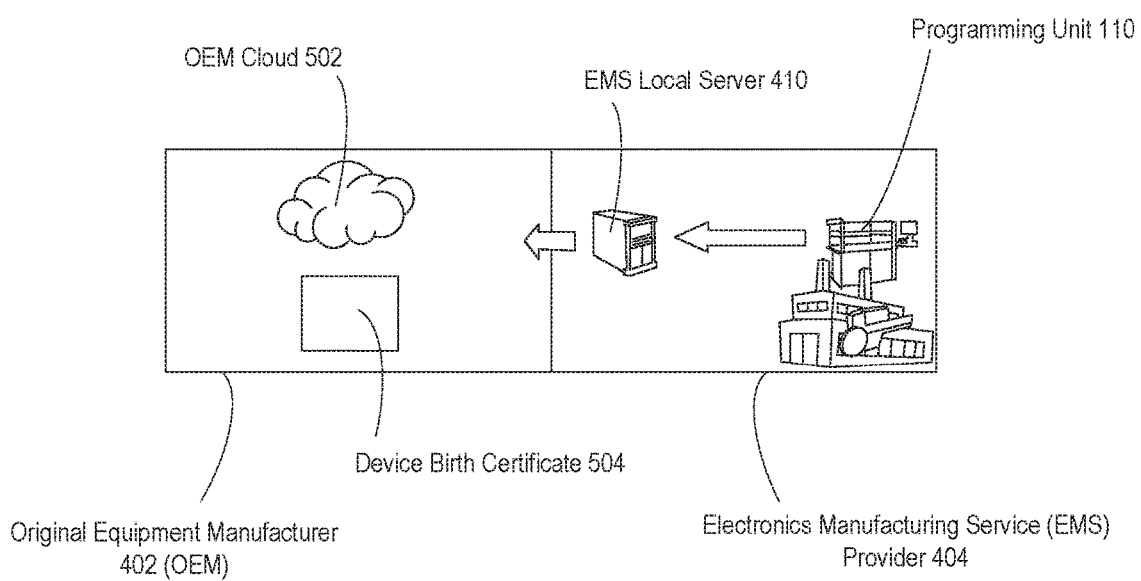
FIG. 5 is a second example application of the secure programming system.

Referring now to FIG. 5, therein is shown a second example application of the secure programming system 100. The second example application depicts a SDM environment that may be used by the EMS provider 404 for monitoring of and collecting statistics from programming the programmable devices 128. During production of the programmable devices 128, programming statistics data may be continuously collected by the programming unit 110 and reported to the EMS local server 410. The statistics data may then be sent to the OEM 402.

For illustrative purposes, although the EMS provider 404 is shown as an example of a facility that can program the programmable devices 128, it is understood that any facility may program the programmable devices 128. For example, a programming center or any other facilities may program the programmable devices 128.

The statistics may be sent to an OEM cloud 502, which may provide shared processing resources and data to computers and other devices on demand. The OEM cloud 502 may include Internet-based storage and computing resources (e.g., networks, servers, storage, applications, services, etc.). The OEM cloud 502 may provide users and enterprises with various capabilities to store and process data in data centers. For example, the OEM cloud 502 may include the OEM local server 408, the OEM workstation 406, etc.

The statistics data may be collected over any timeframe (e.g., real-time, predefined durations, etc.). The statistics data may be queried at an OEM location by the OEM workstation 406, the OEM local server 408, etc. The statistics data may include programming information, serial numbers, other unique information, etc., that establish unique information for a device birth certificate 504 for each programmable device 128.

In one or more embodiments, a job creation process may be implemented in software (SW). The job creation process may be distinct from a job running SW to eliminate operator errors.

The statistics data may include programming metrics reports, such as a number of devices consumed, programmed, pass, fail, etc. Programming metrics reports may be used to improve reliability and security. The reliability may increase programming yields to greater than 99.5%. The metrics reports may provide faster device support and a TCOP cut by ⅔. The SDM environment may include a remote monitoring application program interface (API) to collect and report the statistics data.

Figure 6:
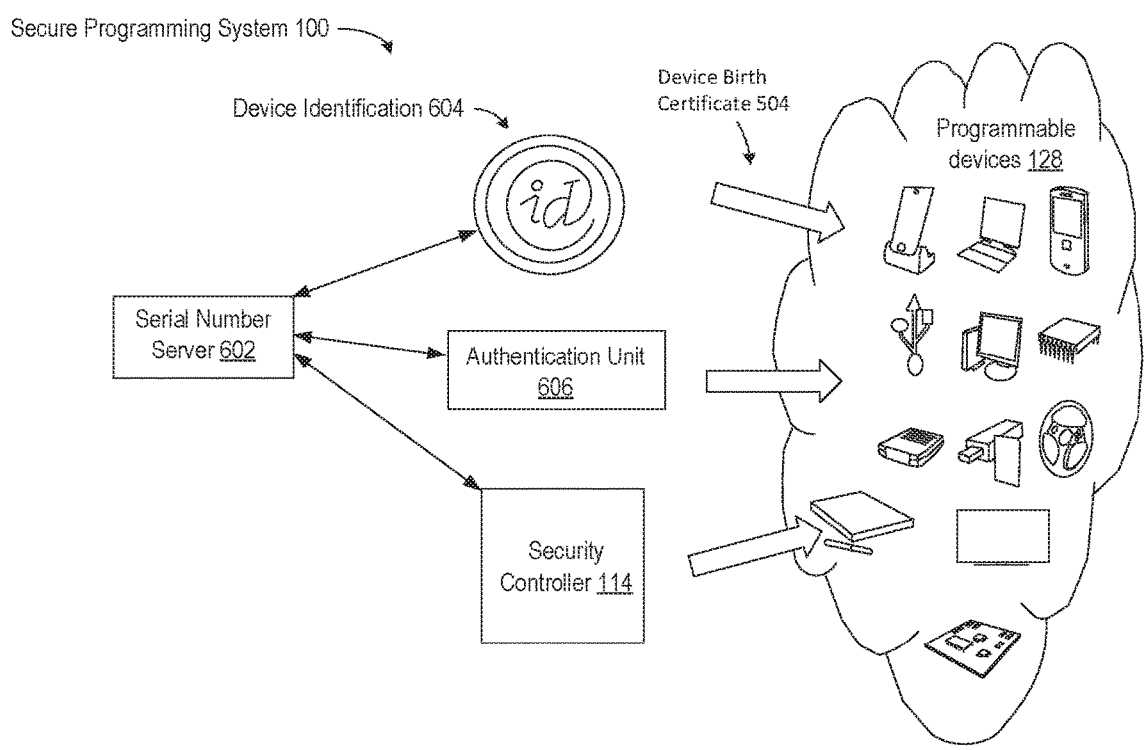
FIG. 6 is a third example block diagram of the secure programming system.

Referring now to FIG. 6, therein is shown a third example block diagram of the secure programming system 100. The third example block diagram depicts serialization of the secure programming system 100.

The secure programming system 100 may include a serial number server 602 to use serialization to create or generate serial numbers as unique signatures or identifier for a device birth certificate 504 of a programmable device 128. The secure programming system 100 may include a device identification 604, which may include a serial number, that may be used to generate the device birth certificate 504. The device birth certificate 504 may then be stored into the programmable devices 128.

In an embodiment, the serial number server 602, the security controller 114, or the authentication unit 606 may be units or components that are separate or outside of the programmer 112. In another embodiment, any combination of the serial number server 602, the security controller 114, the authentication unit 606, etc. may be integrated into the programmer 112.

The device identification 604 may be a computing device for processing security information. In an embodiment, the device identification 604 may include specific cryptographic and computational hardware to facility the processing of the serial numbers to generate unique identifiers to be used for the device birth certificate 504. In another embodiment, serial numbers may be used directly as unique identifiers, which may not be encrypted.

The device identification 604 may include a cryptography mechanism using the security keys 106. As an example, the cryptographic mechanism may include, but is not limited to, a public-key or an asymmetric key cryptography in which a pair of two different but mathematically related keys may be used—a public key and a private key. As another example, a public key system may be constructed so that calculation of one key (e.g., a private key) may be computationally infeasible from the other key (e.g., a public key), even though they are related. Both public and private keys may be generated secretly as an interrelated pair.

For example, the device identification 604 may be implemented in the programmer 112 to encrypt a unique identifier using a private key of the programmer 112 before the unique identifier is used to generate the device birth certificate 504 and the device birth certificate 504 is programmed into the programmable devices 128. When the device birth certificate 504 is retrieved after a programmable device 128 is programmed, the encrypted unique identifier may be decrypted using a public key of a key pair.

The secure programming system 100 may include an authentication unit 606 that saves the serial numbers for subsequent processing. For example, after the programmable devices 128 are programmed, the saved serial numbers may be used by the authentication unit 606 to verify if a serial number sent from the host computer 202 of FIG. 2 matches one of the saved serial numbers. If a match occurs, the authentication unit 606 may grant the host computer 202 access to the programmable device 128 that has been identified by the serial number.

The secure programming system 100 may include the security controller 114 to provide an additional level of protection. The security controller 114 may provide a security key, which may be saved in the device birth certificate 504. The security key may be used for cryptography to encrypt or decrypt contents of the device birth certificate 504.

Figure 7:
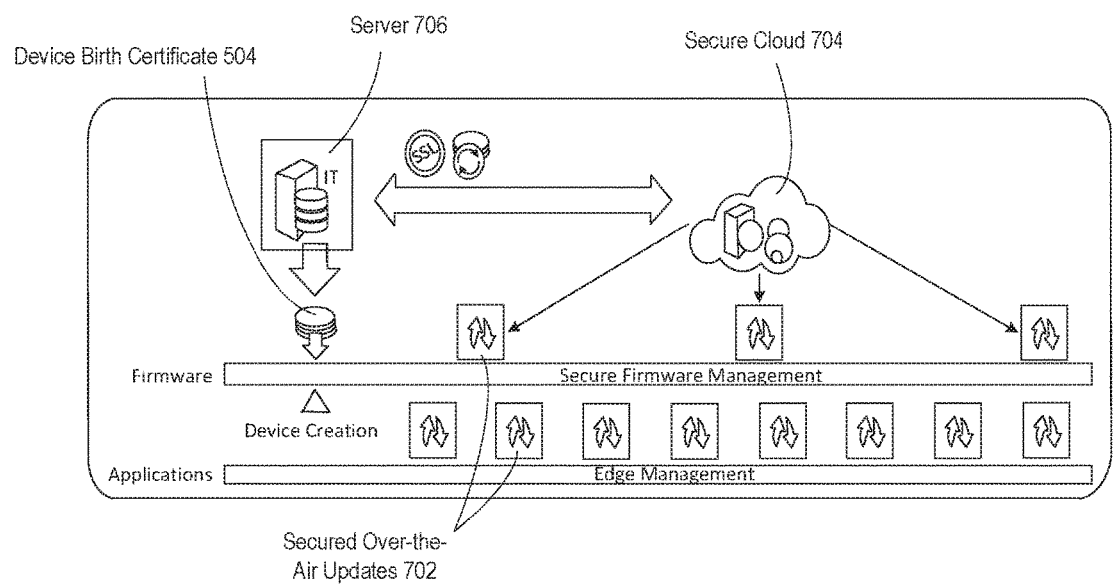
FIG. 7 is an example block diagram depicting an on-the-fly update solution of the secure programming system.

Referring now to FIG. 7, therein is shown an example block diagram depicting an on-the-fly update solution of the secure programming system 100. Combined with secure over-the-air updates 702 and data exchange services provided by a secure cloud 704, a total security solution for IoT devices may be possible using the secure programming system 100. The security solution may be provided with or without proprietary silicon chips having security functionalities.

The secure over-the-air (OTA) updates 702 may include various methods of distributing new software, configuration settings, etc., or updating encryption keys to devices, such as cellphones, set-top boxes, secure voice communication equipment, encrypted 2-way radios, etc. The secure over-the-air (OTA) updates 702 may be provided by the secure cloud 704 to send firmware updates to the programming unit 110. The secure cloud 704 may receive the updates from a server 706. For example, the server 706 may include the secure master storage system 102, the security master system 104, the security keys 16, etc.

In an embodiment, the server 706 may send secure information to the programming unit 110 to create the device birth certificate 504, which may be subsequently programmed into the programmable devices 128. In another embodiment, the server 706 may create the device birth certificate 504 and send the device birth certificate 504 to the programming unit 110 to program or store the device birth certificate 504 in the programmable devices 128. As an example, the device birth certificate 504 may be used for downstream cloud-based updates and data analysis services to securely update firmware (FW) for the programmable devices 128, including IoT clients, etc., and retrieve data from known trusted end-points.

The secure programming system 100 may provide an optimal option for programming the programmable devices 128. The secure programming system 100 may include a managed and secure programming (MSP) mechanism for baseline programming. The secure programming system 100 may add the serialization as an integrated serialization at time of programming the programmable devices 128. The secure programming system 100 may include a unique algorithm to address private one-time programmable (OTP) memory regions of microcontrollers, flash memories, other non-volatile memories, etc.

Figure 8:
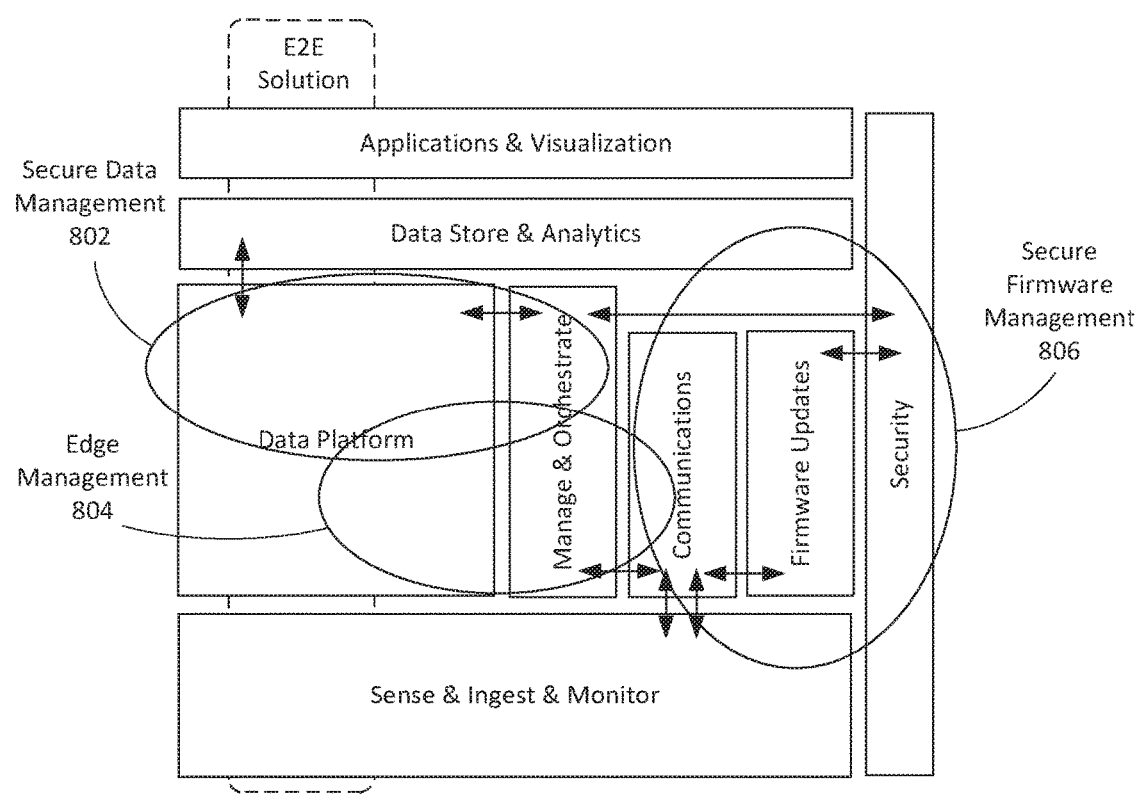
FIG. 8 is an example block diagram depicting an end-to-end solution beyond manufacturing of the secure programming system.

Referring now to FIG. 8, therein is shown an example block diagram depicting an end-to-end (E2E) solution beyond manufacturing of the secure programming system 100. The secure programming system 100 may provide the end-to-end solution without a custom or proprietary security chip, which is an added cost.

Existing methods provide approaches for over over-the-air updates and authentication, but these approaches ignore the FW/SW and manufacturing 'Root of Trust' issues. The existing methods may provide device security that requires extra chips, which impose extra bill of material (BOM), power, and silicon or board real estate costs.

However, the secure programming system 100 provides a different approach with additional benefits. The secure programming system 100 may not require the added real estate, power, or bill of materials costs. The secure programming system 100 may be platform and ecosystem independent since existing or additional security chips are not required in the secure programming system 100. The secure programming system 100 may provide a foundational architecture on which other approaches may reside or use. The secure programming system 100 may be available to silicon suppliers that program the programmable devices 128 when the programmable devices 128 are manufactured at a silicon level or a system level prior to programming the programmable devices 128.

The secure programming system 100 may include a secure data management (SDM) 802, which may include a protection hardware solution mechanism with manufacturing monitoring processes. The protection hardware solution mechanism may provide programming jobs with product firmware and semiconductor device programming algorithms that may be created at an OEM facility. The SDM 802 may be used for data sharing quality of service (QoS), distributed analytics, etc.

The secure programming system 100 may include an edge management 804, which may be used for device authentication, device management, application updates, etc., for the programmable devices 128. The secure programming system 100 may include a secure firmware management 806, which may be used for firmware and security certificates, audit trails on core device changes, statistics collection, etc. The secure firmware management 806 may be involved with updating the firmware in the programmable devices after receiving update information from the secure cloud 704 using the secure over-the-air updates 702.

The programming jobs may be encrypted and assigned to a specific programmer 112 anywhere around the world. If a programming job arrives at a programmer 112 with an assigned programmer serial number, the job file may get decrypted and a programming process may begin. The programming job may also include local serialization within an OEM facility. The SDM 802 may use local servers at each location (e.g., OEM, EMS, etc.) to facilitate network key exchanges, job encryptions, job transfers to manufacturing facilities, statistics collections, etc.

When a programmable device 128 is programmed, the device birth certificate 504 may be used. For example, the device birth certificate 504 may include a program device ID, birth certificate parameters, a serial number of the programmer or programmer ID, a job package number, a manufacturer ID, etc. The device birth certificate 504 may be linked to or associated with a job package that is actually programmed into a programmable device 128.

The device birth certificate 504 or components of the device birth certificate 504 may be stored in secure non-volatile memory areas of the programmable devices 128 with a variety of features. Each of the secure non-volatile memory areas may provide varying degrees of security. For example, the features may include OTP areas, device private OTP areas, hardware fuses, Read-Only Memory (ROM), write protected memory, cryptographically controlled memory access areas (e.g., Replay Protected Memory Block (RPMB), etc.), etc. Also, for example, these features may apply to the programmable devices 128.

The device private OTP areas may have different properties than those of the OTP areas. As an example, a device private OTP area of a programmable device 128 may be internally accessed or programmed only by the programmable device 128. As another example, an OTP area of a programmable device 128 may be externally accessed or programmed by the programmer 112 or internally accessed or programmed by the programmable device 128.

For example, the device birth certificate 504 may reside or stored in the OTP memory, which may be tamper resistant. The OTP memory may include a programmable memory, which may not be overwritten after the memory is programmed. Also, for example, the device birth certificate 504 may be stored in an OTP region of a read-only memory (ROM) on the programmable device 128. Encryption may be used to prevent unauthorized readings of the OTP region.

The secure programming system 100 may impregnate the programmable devices 128 with the device birth certificate 504. The device birth certificate 504 may be employed for a device, a board, a system, etc.

The serialization may be used for service and traceability. The traceability may be used to determine a device history, a location of where the device was manufactured, a location of the programmer that programmed the device, the image that was used to program the device, etc.

The secure programming system 100 may include the edge management 804 for authentication and verification using a device ID for identification. The secure programming system 100 may use the authentication to prevent reverse engineering of the programmable devices 128. The secure programming system 100 may use the identification to identify the programmable devices 128. Both the authentication and the verification/identification may be built on top of the device birth certificate 504.

The device birth certificate 504 may provide the Root of Trust or the basis for the trust. The device birth certificate 504 may provide security for on-the-fly updates. The device birth certificate 504 may provide security for a first time boot process to be sure that programming occurs on a known device.

In an embodiment, security is greatly simplified using the device birth certificate 504. The security is improved because the device birth certificate 504 provides an additional level of protection using the authentication and the verification of the programmable devices 128.

The secure programming system 100 may include another Root of Trust on top of the Root of Trust. For example, the secure programming system 100 may be configured to have a license key upon boot up of the secure master storage system 102, the security master system 104, the secure programming system 100, the programmer 112, the programmable devices 128, etc. The secure programming system 100 may provide an application in the programming unit 110 that secures content or information to be sent to and utilized by the programmable devices 128.

In an embodiment, the secure programming system 100 may provide a software solution without additional hardware or security chips/devices. For example, the secure programming system 100 may use software in the programmer 112 to program the device birth certificate 504 into the programmable devices 128. The software may include functionalities to identify or authenticate the programmable devices 128 using cryptography.

The device birth certificate 504 may be stored in an OTP memory having any sizes. For example, the OTP memory may have less than 1 kilobyte (KB). Also, for example, the OTP memory may be a separate partition in a flash memory. Further, for example, the OTP memory may be in a Replay Protected Memory Block.

For example, the OTP memory may include a memory region of any sizes (e.g., 64 KB, 128 KB, 256 KB, etc.). Also, for example, the secure programming system 100 may use an existing region or a user data region in a memory device and then may convert or configure the region into an OTP region.

For example, the device birth certificate 504 may be read protected or encrypted so that the device birth certificate 504 cannot be hacked to prevent the device birth certificate 504 from being copied or altered.

The serialization may be used to generate the serial number, which is a unique number for each device or customer who is using a manufacturing service to program a device. A serial number may include unique information or stamp on the device. For example, the serial number may include a numerical value indicating a position of a device on the programmer 112. Also, for example, the serial number may be identified using non-electronic methods including, but are not limited to, any of: a radio frequency identification (RFID) tag, a sticker, a label, an identifier that would need optical methods to recognize the identification of the device, etc.

In an embodiment, reliability is greatly simplified using the device birth certificate 504. The device birth certificate 504 may include security features or programming parameters that improve programming data security and traceability. The programming parameters may maintain reliability with greater than 99.5% programming yields of the programmable devices 128. Furthermore, the secure programming system 100 may provide faster custom device support and leverage automation, thereby reducing the total cost of programming (TCOP) of each device.

System 100 illustrates only one of many possible arrangements of components configured to provide the functionality described herein. Other arrangements may include fewer, additional, or different components, and the division of work between the components may vary depending on the arrangement. For example, in some embodiments, some of the security modules may be omitted, along with any other components relied upon exclusively by the omitted component(s). As another example, in an embodiment, system 100 may further include multiple serial numbers or other system identifiers.

3.0. FUNCTIONAL OVERVIEW

Figure 9:
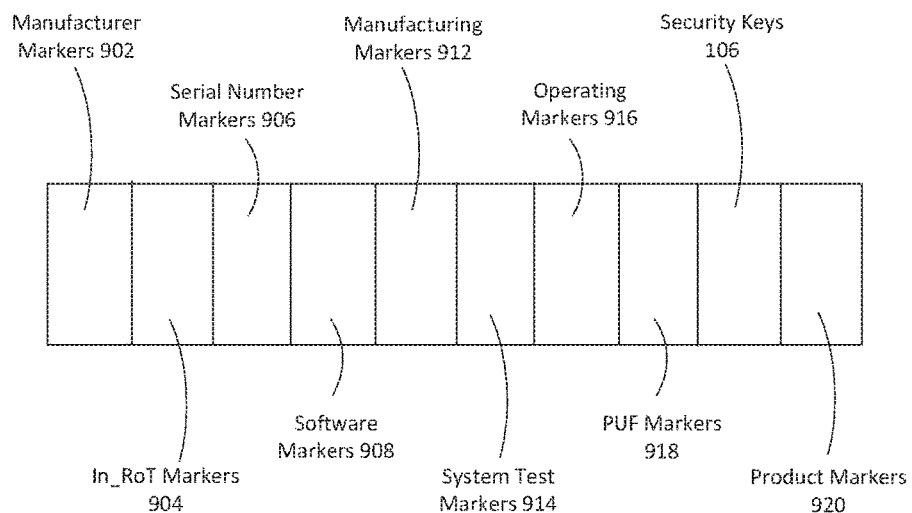
FIG. 9 is an example of a device birth certificate according to an embodiment.

Referring now to FIG. 9, therein is shown an example of the device birth certificate 504 according to an embodiment. The security information 148 may include, but is not limited to, the device birth certificate 504 programmed to the programmable devices 128 at time of manufacture of the programmable devices 128. For example, the device birth certificate 504 may be implemented in systems for media related services (e.g., digital rights management (DRM), etc.), financial services (e.g., e-payments, etc.), personal identification, etc.

In one or more embodiments, a programming unit 110 may create a device birth certificate 504 for each programmable device 128. The device birth certificate 504 may enable identification or authentication of a programmable device 128. An unauthorized, fake, or clone device may be rejected or disabled by a programming unit 110 when the device birth certificate 504 is invalidated by the programming unit 110.

The secure programming system 100 may provide a unique SDM technology having an improved programming quality and security at the time of manufacture. The secure programming system 100 may generate a device birth certificate 504 for a programmable device 128 to establish a Root of Trust. The device birth certificate 504 may be stored on the devices or the media.

The term Root of Trust referred to herein may refer to a set of functions in a trusted or secured computing module that includes hardware components, software components, or a combination of hardware and software components. For example, these functions may be implemented in, but are not limited to, a boot firmware, a hardware initialization unit, a cross-checking component/chip, etc. Also, for example, the functions may be implemented using, but is not limited to, a separate compute engine that controls operations of a cryptographic processor.

The secure programming system 100 may provide a mechanism having a unique role to play in a womb-to-tomb security for devices and data of the devices. In security, the number-one challenge for growth and market acceptance creates barriers for companies to investing in IoT. The challenge relates to concerns about the privacy and security aspects of the IoT. Security starts with firmware (FW), for example, in security flaws of the IoT devices including insecure software/firmware and insufficient authentication.

In one or more embodiments, the secure programming system 100 may provide improved security for IoT devices. The secure programming system 100 provides a womb-to-tomb security for the IoT devices and secures manufacturing at any locations for all systems using a Root of Trust established in manufacturing. The secure programming system 100 may provide secured updates, a data analysis, or possibly an end-to-end service for the lifetime of the devices.

The secure programming system 100 may provide security that starts with programming and manufacturing. The secure programming system 100 provides security that starts at the time of manufacture. The security may be provided by controlled FW code, proven untampered programming, and the device birth certificate 504 that establishes the Root of Trust for subsequent updates and data analysis.

The programming unit 110 may inject or program the device birth certificate 504 into each programmable device 128 at a time of manufacturing the programmable device 128. The device birth certificate 504 may include device specific information or unique DNA. This process may establish a unique Root of Trust for each device at a time of manufacturing the device.

An RoT may be stored in a secure storage, including, but is not limited to, a tamper resistant Non-Volatile Memory (NVM) region on the device. The secure storage may be available for the active lifetime of the device. A Root of Trust may be used to deliver device related services. For example, the device related services may include, but are not limited to, a device identification, a device authentication, a secure device provisioning, a secure update service, media related services (e.g., DRM, etc.), financial services (e.g., e-payments, etc.), etc.

The device birth certificate 504 may be used to uniquely identify any combination of the programmable devices 128, the secure programming system 100, the programmer 112, etc. The device birth certificate 504 may have a variety of configurations. In one or more embodiments, the device birth certificate 504 may include any combination of manufacturer markers 902, incoming Root of Trust (In_RoT) markers 904, serial number markers 906, software markers 908, manufacturing markers 912, system test markers 914, operating markers 916, Physically Uncloneable Function (PUF) markers 918, the security keys 106, product markers 920, etc.

The manufacturer markers 902 are security elements that can describe or identify the manufacturer that may make or use the programmable devices 128. For example, the manufacturer markers 902 may be used to identify original equipment manufacturers (OEM), electronics manufacturing service (EMS) providers, programming centers, contract manufacturers (CM), etc. The manufacturer markers 902 may include manufacturer IDs, programming company IDs, programmer IDs, license information, time windows, authorized locations (e.g., postal addresses, geographical coordinates, etc.) of manufacturers, authorized factories, product lot sizes, serial number ranges of the programmable devices 128, other OEM related parameters, etc.

The In_RoT markers 904 are security elements that can describe information that have been previously programmed or configured in a programmable device 128 prior to programming the programmable device 128. The In_RoT markers 904 may be retrieved from a device birth certificate 504 of a programmable device 128 that was previously programmed.

In an embodiment, In_RoT markers 904 in a device birth certificate 504 of a programmable device 128 that was previously programmed may be used to generate a device birth certificate 504 for another programmable device 128, which may include, but is not limited to, any of: a printed circuit board, an electronics or computing system, etc. In another embodiment, a device birth certificate 504 of a programmable device 128 that was previously programmed may be re-programmed with additional security elements, markers, RoTs, etc.

In one or more embodiments, the previously programmed information may have been programmed into any combination of: adapters (e.g., 122, 124, 126, etc.) that used for programming the programmable devices 128, the programmer 112, the security controller 114, the security master system 104, the programmable devices 128, the secure master storage system 102, security modules (e.g., 116, 118, 120, etc.), etc.

For example, the In_RoT markers 904 of a programmed device 128 that has already been programmed may include a programmer identification (ID) that was used to program the programmed device 128. The programmer ID may identify the programmer 112, the programming unit 110, etc.

A serial number marker 906 is unique information assigned to each programmable device 128. A serial number marker 906 of a programmable device 128 may be different from another serial number marker 906 of another programmable device 128 such that there may not be two programmable devices 128 that share the same serial number marker. The serial number markers 906 may be generated by the programmer 112. Each serial number marker 906 may be assigned to each programmable device 128 by the programmer 112. For example, a serial number marker 906 may represent an ID of a programmable device 128.

The software markers 908 are security elements that can describe or identify the software used in the programmable devices 128. For example, the software markers 908 may identify boot loaders, OS, firmware, applications, etc.

For example, the software markers 908 may identify the versions of the firmware used in the programmable devices 128. Also, for example, a programmable device 128 may be a printed circuit board having firmware installed on the board. A firmware marker 908 may identify the version number for each separate firmware element. The firmware version information could be used to coordinate interoperability between code elements in the programmable devices 128.

For example, the software markers 908 may include information about how the firmware used in the programmable devices 128 may be verified. The firmware used in the programmable devices 128 may be verified using a verification method that may detect if the firmware code has been altered, corrupted, or compromised. As an example, a verification method may include, but is not limited to, any of: hash functions, checksums, Data Encryption Standard (DES) algorithms, Advanced Encryption Standard (AES)

algorithms, triple-DES algorithms, MD4 message-digest algorithms, MD5 algorithms, Secure Hash Algorithms 1 and 2, any other algorithms, etc.

The manufacturing markers 912 are security elements that can describe one or more manufacturing properties. The manufacturing markers 912 may include information associated with components when the components are manufactured. For example, the manufacturing markers 912 may include, but are not limited to, any of: a programmer ID of the programmer 112, a customer ID, a location (e.g., geographical coordinates, etc.) of manufacture or programming of a component, a date or a time of manufacture or programming of a component, a time window, a factory or manufacturer ID, a vendor ID, a customer ID, OEM identification information, MES identification information, manufacturing equipment information, manufacturing related parameters, etc.

Also, for example, a manufacturing marker 912 may include a customer ID of a company or an OEM that contracts an EMS provider to build, assemble, program, test, etc., the programmable devices 128. Further, for example, a manufacturing marker 912 may include a uniform resource locator (URL) identifier pointing to where a job package is stored in the cloud, a revision control ID or information that may be used to determine what is on the device compared to the state of the device when it is an un-programmed device, etc.

The system test markers 914 are security elements that can describe test environments. For example, the system test markers 914 may include information that conveys test parameters that are used to configure the programmer 112. Also, for example, the system test markers 914 may include results of tests performed to verify the programmable devices 128. In this example, the system test markers 914 may include information that indicate whether each programmable device 128 passes or fails a certification test, a compatibility test, etc.

The operating markers 916 are security elements that can describe the operating properties for the programmable devices 128. The operating markers 916 can include, but are not limited to, any of: operating voltages, voltage patterns, current levels, power draws, heating factors, critical operating frequencies, operating sequence information, operating parameters, etc.

The PUF markers 918 are security elements that can describe types of physical entities implemented in the programmable devices 128. PUFs may be physical entities that are embodied in physical structures of the programmable devices 128. PUFs may be evaluated but may not be predicted. Furthermore, an individual PUF device may be made but practically impossible to duplicate, even given the exact manufacturing process that produced it. PUFs may be implemented in integrated circuits of the programmable devices 128. PUFs may be used in secure data applications.

PUFs may depend on the uniqueness of their physical microstructures. These microstructures may depend on random physical factors that may be introduced during manufacturing of the programmable devices 128. These factors may be unpredictable or uncontrollable, thus making it impossible to duplicate or clone the microstructures.

For example, PUFs may be subject to environmental variations, including, but are not limited to, any of: temperatures, supply voltages, electromagnetic interferences, etc., which may affect the performance of the PUFs. Also, for example, the PUF markers 918 may include, but are not limited to, any of: a number of static random-access memory (SRAM) bits at power up, etc.

The security keys 106 are information used for cryptography. The security keys 106 may include at least a pair of a private key and a public key that are used together for cryptography. For example, security information may be encrypted with the private key and decrypted using the public key. Also, for example, security information encrypted using the public key may be decrypted using the private key. Each programmable device 128 may include a separate key pair that may be used to individually encrypt or decrypt the security information 148 stored in the programmable device 128. The security master system 104 or the secure master storage system 102 may generate and securely store the security keys 106 for encrypting or decrypting the security information 148.

The product markers 920 are security elements that can describe the products used with the programmable devices 128. The product markers 920 may include related manufacturers, branding information, product line information, model information, or other product related parameters, etc.

In one or more embodiments, the device birth certificate 504 may include a device related fingerprint. The device related fingerprint may be associated with a programmable device 128. For example, the device related fingerprint may include, but is not limited to, any combination of the serial number markers 906, the manufacturer markers 902, the manufacturing markers 912, etc.

For example, the serial number markers 906 may include a device serial number that uniquely identifies the programmable device 128. Also, for example, the manufacturer markers 902 may include a manufacturer ID that uniquely identifies a manufacturer of the programmable device 128.

For example, the manufacturing markers 912 may include a customer ID that uniquely identifies an entity, a company, a person, etc., that contracts or hires a manufacturer to make, use, or program the programmable device 128. Also, for example, the manufacturing markers 912 may include device coordinates (e.g., geographical coordinates X, Y, and Z in meters, etc.) that identify a physical location where the programmable device 128 is made or assembled.

The device coordinates may be applicable to a programmable device 128 that was at rest or within a predefined distance from a physical location of the manufacturer when the programmable device 128 was manufactured by the manufacturer. In an embodiment, the device security of the programmable device 128 is greatly simplified by verifying the device coordinates in the manufacturing markers 912 before the programmable device 128 is programmed. The programmable device 128 may be programmed only if the device coordinates point to a physical geographical location of an authorized manufacturer.

In one or more embodiments, the device birth certificate 504 may include a programming related fingerprint. For example, the programming related fingerprint may include, but is not limited to, any combination of the manufacturer markers 902, the manufacturing markers 912, the software markers 908, etc.

For example, the manufacturer markers 902 may include programming company IDs that uniquely identify companies that are hired or contracted to program the programmable devices 128. Also, for example, the manufacturer markers 902 may include programmer IDs that uniquely identify serial numbers of programmers 110 that are used to program the programmable devices 128.

For example, the manufacturing markers 912 may include programming coordinates (e.g., geographical coordinates X, Y, and Z in meters, etc.) that identify a physical location where the programmable device 128 was programmed. Also, for example, the manufacturing markers 912 may include a job key that is used for cryptography to protect a programming job. As such, the job key may secure programming jobs throughout a supply chain, where the jobs may be transferred from an OEM/design facility to a manufacturing facility. The job key may also facilitate traceability of a programming job in a job store repository (e.g., server, private cloud, public cloud, etc.).

For example, the manufacturing markers 912 may include a job checksum that may be used to verify a programming job. The checksum may be computed by a programming engine of the programmer 112.

In one or more embodiments, the device birth certificate 504 may include a security related fingerprint. For example, the security related fingerprint may include, but is not limited to, the security keys 106, etc.

For example, the security keys 106 may include device keys that may be used for cryptography to protect secure information in the programmable devices 128. Also, for example, the device keys may include, but are not limited to, any of: asymmetric keys, symmetric keys, etc., to encrypt or decrypt information in the device birth certificate 504. The security keys 106 may enable the programmer 112 to securely communicate with trusted endpoints (e.g., servers, trusted devices, etc.).

In one or more embodiments, the device birth certificate 504 may include a fingerprint to enhance or improve device identification and authentication. For example, the fingerprint for the device identification and authentication may include, but is not limited to, any combination of the serial number markers 906, the manufacturing markers 912, etc.

For example, the serial number markers 906 may include serial numbers of components on a printed circuit board during manufacture. Also, for example, the serial numbers may represent IDs or unique identifiers of central processing units (CPUs), other electrical components, users of the programming unit 110, etc., on the PCB. Further, for example, the serial number markers 906 may include MAC addresses of PCBs, system-on-a-chips (SoCs), peripheral devices, etc.

For example, the manufacturing markers 912 may include device data, including, but are not limited to, pictures or images showing placement of various components (e.g., CPUs, SoCs, peripheral devices, etc.) on a PCB. Also, for example, the manufacturing markers 912 may include pictures in any formats (e.g., Joint Photographic Experts Group (JPEG), Graphics Interchange Format (GIF), Tagged Image File Format (TIFF), Portable Network Graphics (PNG), bitmap image file (BMP), device independent bitmap (DIB), etc.). Captured pictures stored in the programmable devices 128 may subsequently be retrieved by the secure programming system 100 for verification or identification of a device, a board, a system, etc.

In one or more embodiments, the device birth certificate 504 may include a fingerprint for a secure storage of code or data. For example, the fingerprint for the secure storage may include, but is not limited to, any combination of the security keys 106, the software markers 908, etc.

For example, the security keys 106 may be used for software (SW), which may be pre-installed on the system during manufacture. The SW may be pre-installed prior to programming the programmable devices 128. The SW may be pre-installed on the programmer 112, the security controller 114, the security modules (e.g., 116, 118, 120, etc.), the security master system 104, the secure master storage system 102, etc.

For example, the security keys 106 may include a pair of a private key and a public key. SW may be encrypted with the private key and decrypted using the public key. Similarly, SW encrypted using the public key may be decrypted using the private key. SW may be encrypted by any of: the programmer 112, the security controller 114, the security modules (e.g., 116, 118, 120, etc.), the security master system 104, the secure master storage system 102, etc. Prior to programming the programmable devices 28, the programmer 112 may use the public key to decrypt the encrypted SW. After SW is decrypted, SW may be used to retrieve the device birth certificate 504.

For example, the software markers 908 may include information that describe or identify additional codes that are security sensitive. The codes may be run on the programmable devices 128. The codes may be extracted or decrypted on demand to provide access to data related to the device birth certificate 504. In an embodiment, data security is greatly simplified using codes encrypted and programmed into the programmable devices 128 at manufacture of the programmable devices 128. Only the codes that are programmed on the programmable devices 128 may be used to access the device birth certificate 504.

For example, codes that are programmed on the programmable devices 128 may be identified only by the software markers 908. The software markers 908 may identify a location or an address of a secure storage where the codes are stored. As such, the codes that are hidden or have access restriction enhance security.

In one or more embodiments, birth certificate related data on the programmable devices 128 may be secured by the secure programming system 100. Data related to the device birth certificate 504 may be stored in non-volatile, tamper resistant, and secure memories on the programmable devices 128.

The device birth certificate 504 may be secured because the device birth certificate 504 is encrypted and may only be decrypted by a system or a device having the correct security keys 106. Contents of the memories on the programmable devices 128 may be programmed to store the device birth certificate 504 only during manufacture of the programmable devices 128.

For example, for the programmable devices 128 (e.g., smartphones, tablets, set top boxes, etc.) that use embedded MMC (eMMC) flash storage, a Replay Protected Memory Block (RPMB) partition of the flash storage may be used to store the device birth certificate 504. An RPMB partition may be used for storing secure data because it prevents illegal data copy or access. An RPMB partition may only be handled or accessed by security keys. For example, security keys may include, but is not limited to, any of: hash functions, checksums, Data Encryption Standard (DES) algorithms, Advanced Encryption Standard (AES) algorithms, triple-DES algorithms, MD4 message-digest algorithms, MD5 algorithms, Secure Hash Algorithms 1 and 2, any other algorithms, etc.

Also, for example, a write-protected partition of a flash storage may be used to store the device birth certificate 504 in conjunction with cryptography to create a tamper resistant and secure area for storage. For microcontroller-based devices, a one-time programmable (OTP) memory or a flash memory may be used with cryptography to store the device birth certificate 504 data securely. Microcontrollers may support secure data exchange protocols that may not be available during normal operation of the programmable devices 128. Prior to normal operation of the programmable devices 128, such protocols may be used to securely exchange data with the programmable devices 128 in a process of programming the programmable devices 128.

In one or more embodiments, for systems that do not include NVM, security chips may be used to hold a subset of information related to the device birth certificate 504 to enable device identification or authentication. For example, the security chips may include any combination of the security controller 114, the security modules (e.g., 116, 118, 120, etc.), the security master system 104, the secure master storage system 102, etc.

4.0. EXAMPLE EMBODIMENTS

Figure 10:
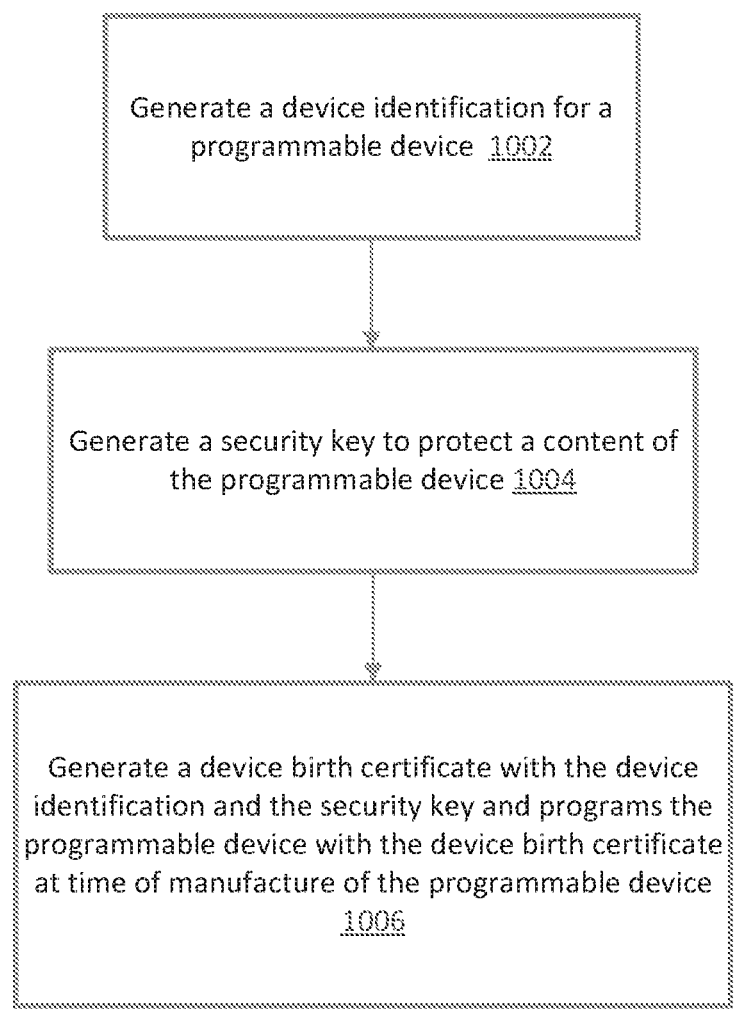
FIG. 10 is an example process flow for data security, in accordance with one or more embodiments.

Referring now to FIG. 10, therein is shown an example process flow for data security, in accordance with one or more embodiments. In some embodiments, a system (e.g., 100) is performed through one or more computing devices or units.

Examples of some embodiments are represented, without limitation, in the following clauses:

In block 1002, the system generates a device identification for a programmable device.

In block 1004, the system generates a security key to protect a content of the programmable device; and In block 1006, the system generates a device birth certificate with the device identification and the security key and programs the programmable device with the device birth certificate at time of manufacture of the programmable device.

In an embodiment, the system encrypts the device identification with the security key, and the device birth certificate is generated with the device identification that has been encrypted.

In an embodiment, the device identification is a unique identifier of the programmable device.

In an embodiment, the device birth certificate is stored in a one-time programmable (OTP) memory of the programmable device.

In an embodiment, the device birth certificate includes a manufacturer marker, the manufacturer marker includes a manufacturer identification that uniquely identifies a manufacturer of the programmable device.

In an embodiment, the device birth certificate includes a manufacturer marker, the manufacturer marker includes a programmer identification that uniquely identifies a serial number of the programmer that programs the programmable device.

In an embodiment, the security key includes a pair of a public key and a private key.

Embodiments include an apparatus comprising a processor and configured to perform any one of the foregoing methods. Embodiments include a computer readable storage medium, storing software instructions, which when executed by one or more processors cause performance of any one of the foregoing methods.

Note that, although separate embodiments are discussed herein, any combination of embodiments and/or partial embodiments discussed herein may be combined to form further embodiments.

Other examples of these and other embodiments are found throughout this disclosure.

5.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, smartphones, media devices, gaming consoles, networking devices, IoT devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 11:
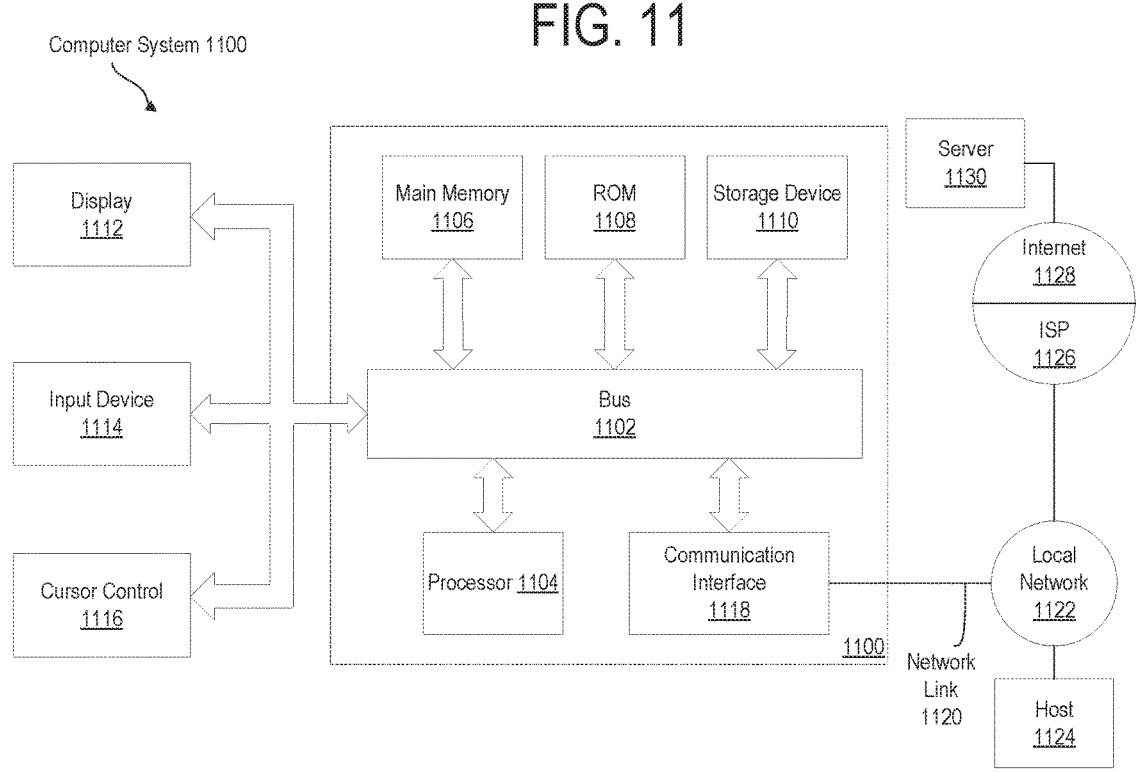
FIG. 11 is block diagram of a computer system upon which embodiments of the invention may be implemented.

Referring now to FIG. 11, therein is shown a block diagram that illustrates a computer system 1100 utilized in implementing the above-described techniques, according to an embodiment. Computer system 1100 may be, for example, a desktop computing device, laptop computing device, tablet, smartphone, server appliance, computing mainframe, multimedia device, handheld device, networking apparatus, or any other suitable device.

Computer system 1100 includes one or more busses 1102 or other communication mechanism for communicating information, and one or more hardware processors 1104 coupled with busses 1102 for processing information. Hardware processors 1104 may be, for example, a general purpose microprocessor. Busses 1102 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1100 also includes a main memory 1106, such as a random access memory (RAM) or other dynamic or volatile storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes one or more read only memories (ROM) 1108 or other static storage devices coupled to bus 1102 for storing static information and instructions for processor 1104. One or more storage devices 1110, such as a solid-state drive (SSD), magnetic disk, optical disk, or other suitable non-volatile storage device, is provided and coupled to bus 1102 for storing information and instructions.

Computer system 1100 may be coupled via bus 1102 to one or more displays 1112 for presenting information to a computer user. For instance, computer system 1100 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1112 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1112.

In an embodiment, output to display 1112 may be accelerated by one or more graphics processing unit (GPUs) in computer system 1100. A GPU may be, for example, a highly parallelized, multi-core floating point processing unit highly optimized to perform computing operations related to the display of graphics data, 3D data, and/or multimedia. In addition to computing image and/or video data directly for output to display 1112, a GPU may also be used to render imagery or other video data off-screen, and read that data back into a program for off-screen image processing with very high performance. Various other computing tasks may be off-loaded from the processor 1104 to the GPU.

One or more input devices 1114 are coupled to bus 1102 for communicating information and command selections to processor 1104. One example of an input device 1114 is a keyboard, including alphanumeric and other keys. Another type of user input device 1114 is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. Yet other examples of suitable input devices 1114 include a touch-screen panel affixed to a display 1112, cameras, microphones, accelerometers, motion detectors, and/or other sensors. In an embodiment, a network-based input device 1114 may be utilized. In such an embodiment, user input and/or other information or commands may be relayed via routers and/or switches on a Local Area Network (LAN) or other suitable shared network, or via a peer-to-peer network, from the input device 1114 to a network link 1120 on the computer system 1100.

A computer system 1100 may implement techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1100 can receive the data on the network and demodulate the signal to decode the transmitted instructions. Appropriate circuitry can then place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

A computer system 1100 may also include, in an embodiment, one or more communication interfaces 1118 coupled to bus 1102. A communication interface 1118 provides a data communication coupling, typically two-way, to a network link 1120 that is connected to a local network 1122. For example, a communication interface 1118 may be an integrated services digital network (ISDN) card, cable modem, satellite modem, or a modem to provide a data communication connection to a corresponding type of telephone line. As another example, the one or more communication interfaces 1118 may include a local area network (LAN) card to provide a data communication connection to a compatible LAN. As yet another example, the one or more communication interfaces 1118 may include a wireless network interface controller, such as an 802.11-based controller, Bluetooth controller, Long Term Evolution (LTE) modem, and/or other types of wireless interfaces. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by a Service Provider 1126. Service Provider 1126, which may for example be an Internet Service Provider (ISP), in turn provides data communication services through a wide area network, such as the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

In an embodiment, computer system 1100 can send messages and receive data, including program code and/or other types of instructions, through the network(s), network link 1120, and communication interface 1118. In the Internet example, a server 1130 might transmit a requested code for an application program through Internet 1128, ISP 1126, local network 1122 and communication interface 1118. The received code may be executed by hardware processors 1104 as it is received, and/or stored in storage device 1110, or other non-volatile storage for later execution. As another example, information received via a network link 1120 may be interpreted and/or processed by a software component of the computer system 1100, such as a web browser, application, or server, which in turn issues instructions based thereon to a hardware processor 1104, possibly via an operating system and/or other intermediate layers of software components.

In an embodiment, some or all of the systems described herein may be or comprise server computer systems, including one or more computer systems 1100 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
   a server device that generates a device identification for a programmable integrated circuit;
   a serial number device that generates a serial number for the programmable device, the serial number unique and serialized;
   a security controller that generates a security key to protect a content of the programmable integrated circuit; and
   a programmer having the programmable integrated circuit attached via a programming adapter to the programmer, the serial number device within the programmer, the programmer generates a device birth certificate that includes a manufacturing marker, the device identification, the serial number, and the security key, the programmer programs a secure non-volatile memory area of the programmable integrated circuit with the device birth certificate only at time of manufacture of the programmable integrated circuit for improving security in a programming system using the programmed device birth certificate for subsequent authentication of the programmable integrated circuit, the manufacturing marker identifying a location where the programmable integrated circuit was manufactured, and the secure non-volatile memory area including an area of the programmable integrated circuit that cannot be tampered with or illegally accessed by an unauthorized user.

2. The system as recited in claim 1, wherein:
   the programmer encrypts the device identification with the security key; and
   the device birth certificate is generated with the device identification that has been encrypted; and
   further comprising:
   an authentication unit that saves the device identification in the security controller coupled to the programmer and verifies if the serial number sent from a host computer matches the device identification that has been saved for granting the host computer access to the programmable integrated circuit that has been identified by the serial number.

3. The system as recited in claim 1, wherein the device identification is a unique identifier of the programmable integrated circuit.

4. The system as recited in claim 1, wherein the secure non-volatile memory area of the programmable integrated circuit includes a one-time programmable (OTP) area, a device private OTP area, a hardware fuse, a Read-Only Memory (ROM), a write protected memory, a cryptographically controlled memory access area, or a Replay Protected Memory Block.

5. The system as recited in claim 1, wherein the device birth certificate includes a manufacturer marker, the manufacturer marker includes a manufacturer identification that uniquely identifies a manufacturer of the programmable integrated circuit.

6. The system as recited in claim 1, wherein the device birth certificate includes a manufacturer marker, the manufacturer marker includes a programmer identification that uniquely identifies a serial number of the programmer that programs the programmable integrated circuit.

7. The system as recited in claim 1, wherein the security key includes a single symmetric key, or a public key or a private key of an asymmetric key pair.

8. A method comprising:
generating a device identification for a programmable integrated circuit;
generating a serial number of the programmable integrated circuit that is serialized and unique;
generating a security key to protect a content of the programmable integrated circuit;
generating a device birth certificate that includes a manufacturing marker, the device identification, the serial number, and the security key; and
programming a secure non-volatile memory area of the programmable integrated circuit via a programming adapter, with the device birth certificate only at time of manufacture of the programmable integrated circuit for improving security in a programming system using the programmed device birth certificate for subsequent authentication of the programmable integrated circuit, the manufacturing marker identifying a location where the programmable integrated circuit was manufactured, the secure non-volatile memory area including an area of the programmable integrated circuit that cannot be tampered with or illegally accessed by an unauthorized user.

9. The method of claim 8, further comprising:
encrypting the device identification with the security key; and
wherein:
the device birth certificate is generated with the device identification that has been encrypted; and
further comprising:
saving the device identification in a security controller coupled to the programmer; and
verifying if the serial number sent from a host computer matches the device identification that has been saved for granting the host computer access to the programmable integrated circuit that has been identified by the serial number.

10. The method of claim 8, wherein the device identification includes a unique identifier for the programmable integrated circuit.

11. The method of claim 8, wherein the secure non-volatile memory area of the programmable integrated circuit includes a one-time programmable (OTP) area, a device private OTP area, a hardware fuse, a Read-Only Memory (ROM), a write protected memory, a cryptographically controlled memory access area, or a Replay Protected Memory Block.

12. The method of claim 8, wherein the device birth certificate includes a manufacturer marker, the manufacturer marker includes a manufacturer identification that uniquely identifies a manufacturer of the programmable integrated circuit.

13. The method of claim 8, wherein the device birth certificate includes a manufacturer marker, the manufacturer marker includes a programmer identification that uniquely identifies a serial number of the programmer that programs the programmable integrated circuit.

14. The method of claim 8, wherein the security key includes a single symmetric key, or a public key or a private key of an asymmetric key pair.

15. One or more non-transitory computer-readable media storing instructions that, when executed by one or more computing devices, cause:
generating a device identification for a programmable integrated circuit;
generating a serial number of the programmable integrated circuit that is serialized and unique;
generating a security key to protect a content of the programmable integrated circuit;
generating a device birth certificate that includes a manufacturing marker, the device identification, the serial number, and the security key; and
programming a secure non-volatile memory area of the programmable integrated circuit via a programming adapter, with the device birth certificate only at time of manufacture of the programmable integrated circuit for improving security in a programming system using the programmed device birth certificate for subsequent authentication of the programmable integrated circuit, the manufacturing marker identifying a location where the programmable integrated circuit was manufactured, the secure non-volatile memory area including an area of the programmable integrated circuit that cannot be tampered with or illegally accessed by an unauthorized user.

16. The non-transitory computer-readable media of claim 15, further comprising:
encrypting the device identification with the security key; and
wherein:
the device birth certificate is generated with the device identification that has been encrypted; and
further comprising:
saving the device identification in a security controller coupled to the programmer; and
verifying if the serial number sent from a host computer matches the device identification that has been saved for granting the host computer access to the programmable integrated circuit that has been identified by the serial number.

17. The non-transitory computer-readable media of claim 15, wherein the device identification includes a unique identifier for the programmable integrated circuit.

18. The non-transitory computer-readable media of claim 15, wherein the secure non-volatile memory area of the programmable integrated circuit includes a one-time programmable (OTP) area, a device private OTP area, a hardware fuse, a Read-Only Memory (ROM), a write protected memory, a cryptographically controlled memory access area, or a Replay Protected Memory Block.

19. The non-transitory computer-readable media of claim 15, wherein the device birth certificate includes a manufacturer marker, the manufacturer marker includes a manufacturer identification that uniquely identifies a manufacturer of the programmable integrated circuit.

20. The non-transitory computer-readable media of claim 15, wherein the device birth certificate includes a manufacturer marker, the manufacturer marker includes a programmer identification that uniquely identifies a serial number of the programmer that programs the programmable integrated circuit.

* * * * *